United States Patent [19]
Galloway et al.

[11] Patent Number: 5,970,236
[45] Date of Patent: *Oct. 19, 1999

[54] CIRCUIT FOR SELECTIVELY PERFORMING DATA FORMAT CONVERSION

[75] Inventors: William C. Galloway, Houston; Ryan A. Callison, Spring, both of Tex.

[73] Assignee: Compaq Computer Corporation, Houston, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 08/557,487
[22] Filed: Nov. 14, 1995
[51] Int. Cl.[6] .................................................. G06F 13/38
[52] U.S. Cl. .............................................................. 395/500
[58] Field of Search ............................................ 395/500

[56] References Cited

U.S. PATENT DOCUMENTS

| | | | |
|---|---|---|---|
| 5,201,039 | 4/1993 | Sakamura | 395/375 |
| 5,410,677 | 4/1995 | Roskowski et al. | 395/500 |
| 5,446,482 | 8/1995 | Van Aken et al. | 345/199 |
| 5,550,987 | 8/1996 | Tanaka | 395/286 |
| 5,574,923 | 11/1996 | Heeb et al. | 395/800 |
| 5,604,885 | 2/1997 | Denio | 395/500 |

OTHER PUBLICATIONS

Intel® Pentium® Processor User's Manual vol. 3: Architecture and Programming Manual, pp. 25–32, 1993.

Fibre Channel Physical and Signalling Interface Specificaiton, Rev. 4.3 (Jun. 1994).

*Primary Examiner*—Vincent N. Trans
*Attorney, Agent, or Firm*—Akin, Gump, Strauss, Hauer & Feld, L.L.P.

[57] ABSTRACT

A circuit for selectively performing big-endian/little-endian data format conversion based on whether instructions or data are being transferred. The data and instructions are allocated to different regions in memory so that the big-endian/little-endian conversion is based on the source or destination address of the requested operation. Registers are provided to define a lower bound address and an upper bound address. In addition, a separate register is provided which indicates whether the data is stored between the lower bound and upper bound addresses or outside the lower bound and upper bound addresses. The registers are write addressable through the PCI configuration space, the memory space, and the I/O space, which allows the values in the registers to be changed dynamically during computer system operation.

43 Claims, 6 Drawing Sheets

LITTLE-ENDIAN

BIG-ENDIAN

(PRIOR ART)
*FIG. 6*

CIRCUIT FOR SELECTIVELY PERFORMING DATA FORMAT CONVERSION

BACKGROUND OF THE INVENTION

1. Field of the Invention

The invention relates to transferring data between devices in a computer system, and more particularly, to a circuit that performs data format conversion when data is transferred between devices which utilize different data formats.

2. Description of the Related Art

Figure 6:
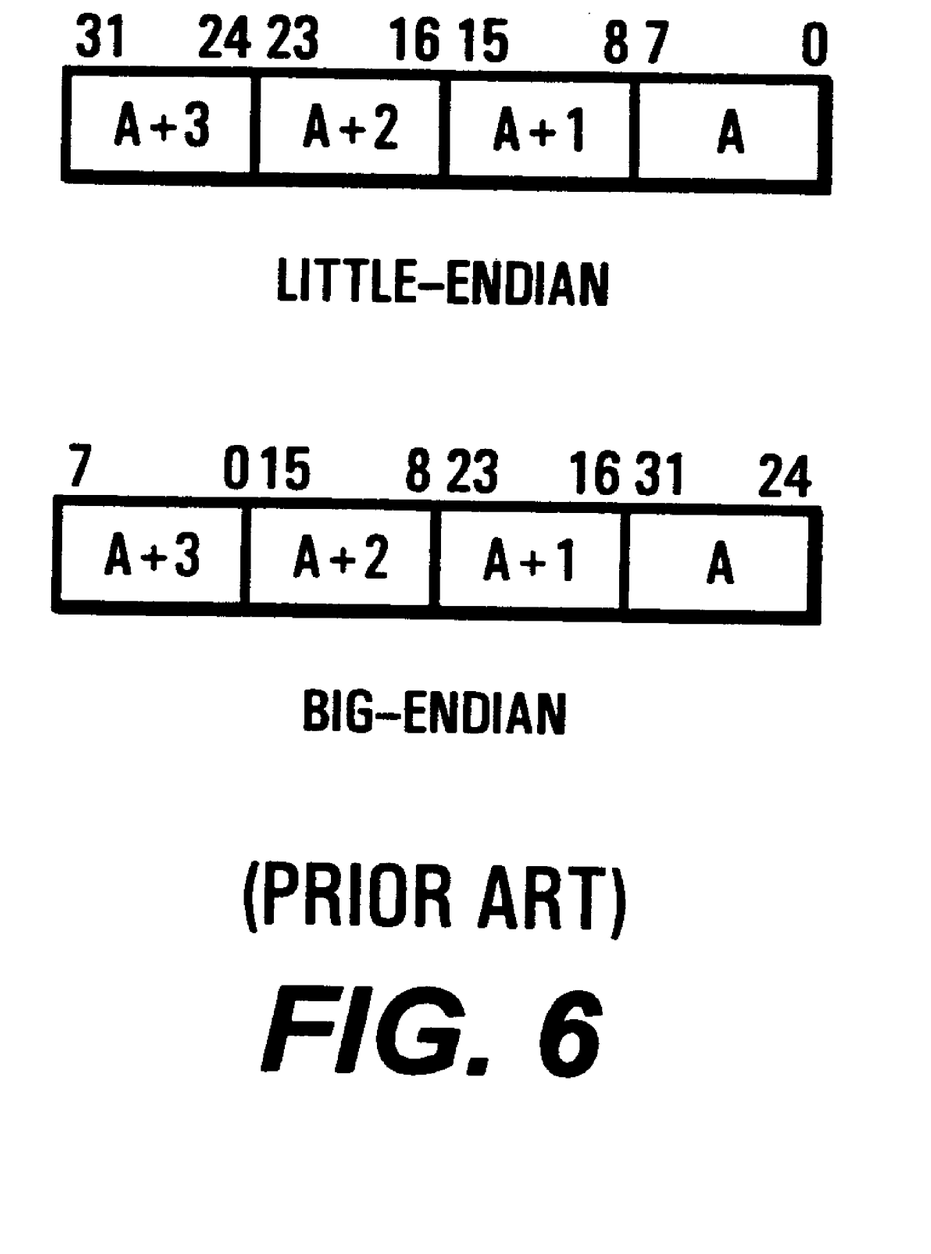
FIG. 6 illustrates the little-endian and big-endian data formats.

In computer systems, two types of formats are used for ordering data: little-endian and big-endian. FIG. 6 illustrates the little-endian and big-endian data formats for a 32-bit doubleword. In the doubleword, bit 31 is the most significant data bit and bit 0 is the least significant data bit. In each doubleword, there are 4 bytes each corresponding to a specific address. In the little-endian format, the most significant byte consisting of data bits 31–24 is accessed by the most significant address A+3, and the least significant byte consisting of bits 7–0 is accessed by the least significant address A. Conversely, in the big-endian data format, the least significant byte consisting of bits 7–0 is accessed by the most significant address A+3, and the most significant byte consisting of bits 31–24 is accessed by the least significant address A.

The 80×86 processors from Intel Corporation normally use the little-endian method for storing data that are larger than one byte. However, the 80×86 processors do include an instruction BSWAP (byte swap) that converts the byte ordering of 32-bit data. The BSWAP instruction converts data having little-endian format into big-endian format and vice versa.

In computer systems where the central processing unit is an Intel 80×86 processor, the data format used is typically the little-endian format. Nonetheless, peripheral devices which are based on the big-endian format are sometimes used in the 80×86-processor-based computer systems. To function properly, these devices must include circuitry to perform little-endian/big-endian data format conversion.

Certain bus devices fetch both instructions and data from computer system memory. The instructions and data are typically used in the same data format by the bus device. In some applications, however, instructions are always double-word aligned but data are not necessarily double-word aligned, which may require that instructions not be converted but data are. For example, the Tachyon Fibre Channel controller from Hewlett Packard uses all four bytes of double-word aligned instructions, which makes data format conversion unnecessary for the instructions. However, received data may not be double-word aligned, which makes byte accessibility within the four bytes of data important. Thus, data format conversion is not necessary if the transferred information consists of instructions but conversion is needed if the transferred information consists of data. As a result, information received by the Fibre Channel controller is used in the little-endian data format if the information consists of instructions and in the big-endian data format if the information consists of data.

SUMMARY OF THE PRESENT INVENTION

A circuit according to the present invention selectively performs big-endian/little-endian data format conversion based on the type of information processed by the circuit. No data format conversion is performed if the information consists of instructions; however, big-endian/little-endian conversion is performed if the information consists of data. In the preferred embodiment of the present invention, instructions and data are stored in computer system memory in the little-endian format. The instructions are stored in a first predefined range of memory addresses, and the data are stored in a second predefined range of memory addresses that is outside the first predefined range. Whether data format conversion is done depends upon the destination or source address of the transferred information. If the destination or source address of the transferred information is within the first predefined range of addresses, then no big-endian/little-endian data format conversion is performed as the operation involves instructions. However, if an information transfer operation involves an address that is within the second predefined range of addresses, then big-endian/little-endian data format conversion is performed. In the preferred embodiment, if the transfer operation is a data read operation from system memory to the peripheral device, then the conversion circuit performs little-endian to big-endian conversion on the read data. If the transfer operation is a data write operation from the peripheral device to memory, then the conversion circuit performs big-endian to little-endian conversion on the write data. No data format conversion operations are performed on transfers involving instructions.

Several advantages are offered by the circuit according to the present invention. First, the big-endian/little-endian data format conversion does not need to be implemented in software (i.e., the device driver) used to control the peripheral device. Further, the inherent delays associated with performing the data format conversion in software are avoided by using the circuit according to the present invention.

BRIEF DESCRIPTION OF THE DRAWINGS

A better understanding of the present invention can be obtained when the following detailed description of the preferred embodiment is considered in conjunction with the following drawings, in which.

DESCRIPTION OF THE PREFERRED EMBODIMENT

Figure 1:
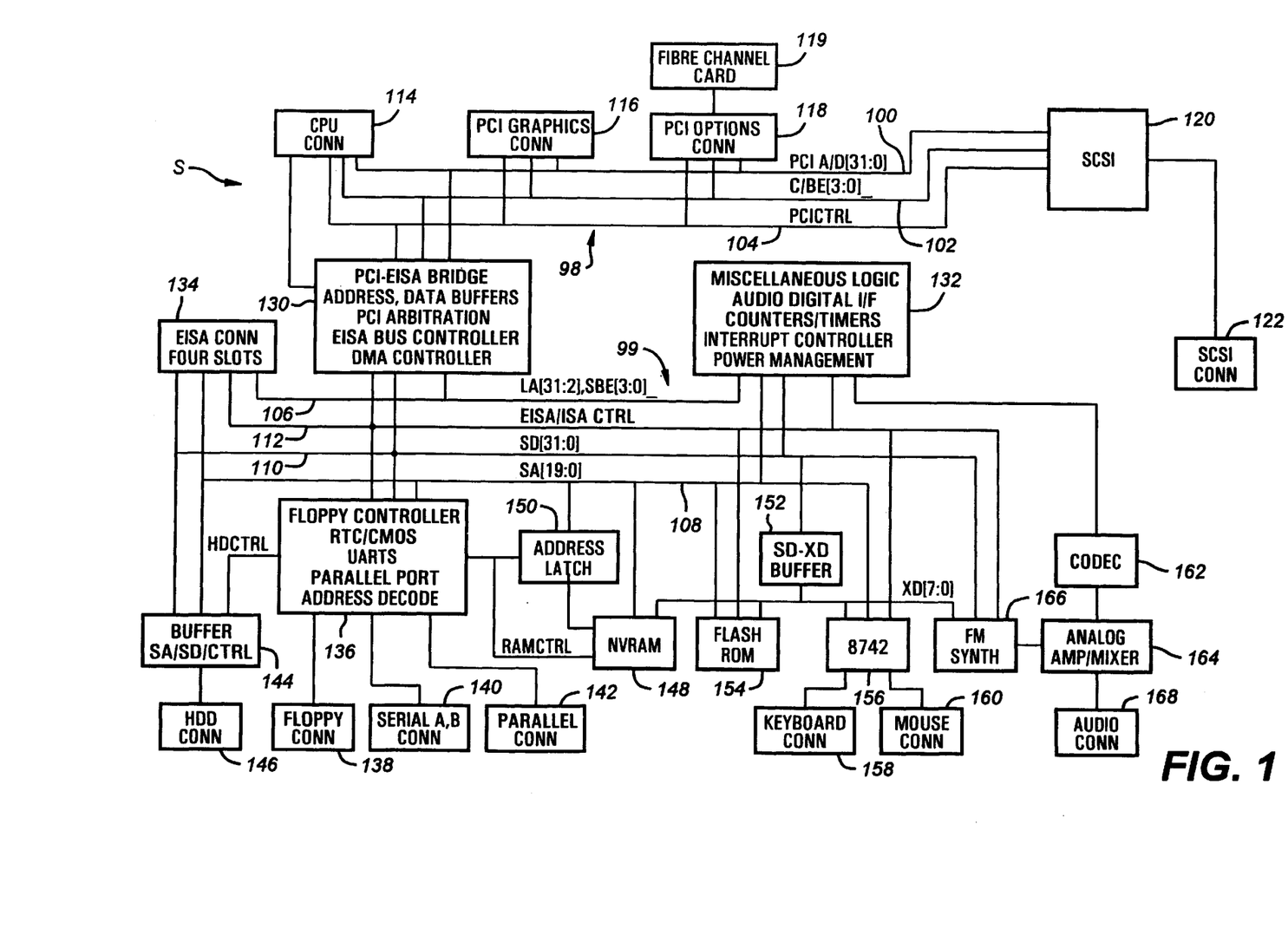
FIG. 1 is a block diagram of a system board used in an exemplary computer system.

Referring now to FIG. 1, a system board S of an exemplary computer system for use with the preferred embodiment of the present invention is shown. The system board S contains circuitry and slots for receiving interchangeable circuit boards, as well as two primary buses. The first bus is the PCI or Peripheral Component Interconnect bus 98 which includes address/data portion 100, also referred to as PCIAD, control and byte enable portion 102 and control signal portion 104. The address/data bus PCIAD is preferably 32 bits wide, although it can be upgraded to 64 bits if desired. The second primary bus on the system board S is the EISA bus 99. The EISA bus 99 includes LA address portion 106, SA address portion 108, SD data portion 110 and EISA/ISA control signal portion 112. The PCI and EISA buses 98 and 99 form the backbones of the system board S.

Figure 2:
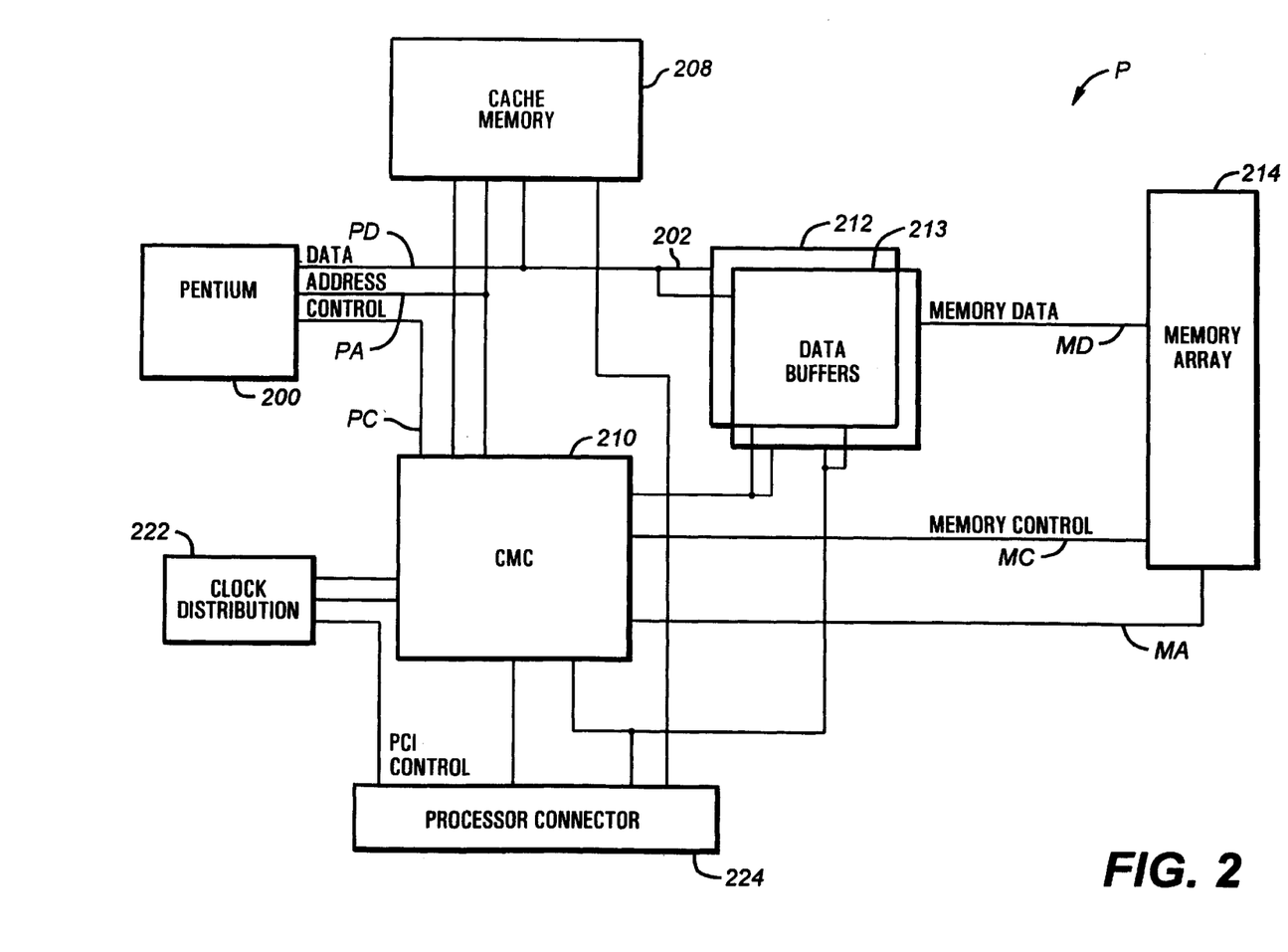
FIG. 2 is a block diagram of a processor board for connection to the system board of FIG. 1.

A CPU connector 114 is connected to the PCI bus 98 to receive a processor card, such as that shown in FIG. 2. A PCI graphics connector 116 is connected to the PCI bus 98 to receive a video graphics card (not shown). The graphics card provides video signals to an external monitor (not shown). A PCI network connector 118 is also connected to the PCI bus 98 to receive a Fibre Channel controller card 119. The Fibre Channel controller card 119 controls the communications between the exemplary computer system and a network communications channel that is according to the Fibre Channel protocol. In addition, a SCSI controller 120 is connected to the PCI bus 98. Preferably, the SCSI controller 120 is a single integrated circuit and includes the capabilities necessary to act as a PCI bus master and slave and the circuitry to act as a SCSI controller. A SCSI connector 122 is connected to the controller 120 to allow connection of various SCSI devices, such as hard disk drives and CD-ROM drives.

A PCI-EISA bridge 130 is provided to convert signals between the PCI bus 98 and the EISA bus 99. The PCI-EISA bridge 130 includes the necessary address and data buffers and latches, arbitration and bus master control logic for the PCI bus, EISA arbitration circuitry, an EISA bus controller as conventionally used in EISA systems and a DMA controller. Preferably the PCI-EISA bridge 130 is a single integrated circuit, but other combinations are possible. A miscellaneous system logic chip 132 is connected to the EISA bus 99. In the preferred embodiment, the miscellaneous system logic chip 132 is implemented as an ASIC. The miscellaneous system logic chip 132 contains a digital audio interface, counters and timers as conventionally present in personal computer systems, an interrupt controller for both the PCI and EISA buses 98 and 99 and power management logic, as well as other miscellaneous circuitry. The PCI-EISA bridge 130 and miscellaneous system logic chip 132 may be proprietary or may be the PCEB and ESC from Intel Corp. or similar chip sets from other vendors.

A series of four EISA slots 134 are connected to the EISA bus 99 to receive ISA and EISA adapter cards. A combination I/O chip 136 is connected to the EISA bus 99. The combination I/O chip 136 preferably includes a floppy disk controller, real time clock (RTC)/CMOS memory, two UARTs, a parallel port and various address decode logic. A floppy disk connector 138 for receiving a cable to a floppy disk drive is connected to the combination I/O chip 136. A pair of serial port connectors 140 are also connected to the combination I/O chip 136, as is a parallel port connector 142. A buffer 144 is connected to both the EISA bus 99 and the combination I/O chip 136 to act as a buffer between the EISA bus 99 and a hard disk drive connector 146 to allow connection of an IDE-type hard disk drive (not shown). A non-volatile random access memory (NVRAM) 148 is connected to the EISA bus 99 and receives its control signals from the combination I/O chip 136. An address latch 150 is connected to the EISA bus 99 and controlled by the combination I/O chip 136 to provide additional addressing capability for the NVRAM 148. Preferably the NVRAM 148 is used to contain certain system information.

A data buffer 152 is connected to the SD portion of the EISA bus 99 to provide an additional data bus XD for various additional components of the computer system. The NVRAM 148 is connected to the XD data bus to receive its data bits. A flash ROM 154 receives its control and address signals from the EISA bus 99 and is connected to the XD bus for data transfer. Preferably, the flash ROM 154 contains the BIOS information for the computer system and can be reprogrammed to allow for revisions of the BIOS. An 8742 or keyboard controller 156 is connected to the XD bus and EISA address and control portions 108 and 112. The keyboard controller 156 is of conventional design and is connected in turn to a keyboard connector 158 and a mouse or pointing device connector 160.

The exemplary computer system also includes audio capabilities. To this end a CODEC chip 162 is connected to the miscellaneous system logic chip 132 and to an analog amplifier and mixer chip 164. An FM synthesizer chip 166 is connected to the analog amplifier and mixer 164 and receives digital information from the XD bus. The FM synthesizer 166 is also connected to the control and data portions 110 and 112 of the EISA bus 99 and is controlled by the miscellaneous system logic chip 132. An audio connector 168 is provided to allow external audio connections to the computer and is connected to the outputs and inputs of the analog amplifier and mixer 164.

Referring now to FIG. 2, a processor board P for use with the system board S is shown. In the processor board P, the CPU or microprocessor 200 is preferably the Pentium processor from Intel, which operates at 50 or 60 MHz externally and 75 or 90 MHz internally. Other processors may also be utilized. The microprocessor 200 is connected to a processor bus 202 having data, address and control portions PD, PA and PC. The width of the data bus PD is 64 bits.

The microprocessor 200 includes an internal or L1 cache memory. A single-chip level 2 (L2) or external cache memory system 208 is connected to the processor bus 202 to provide additional caching capabilities to improve performance of the computer system. The L2 cache 208 is connected to a processor cache and memory controller (CMC) and PCI bridge chip 210. The CMC 210 is connected to the control portion PC and to the address portion PA. The CMC 210 also controls data buffers 212 and 213. Additionally, the CMC 210 provides control signals MC and address signals MA to a main memory 214. The control signals MC include various RAS* and CAS* signals. The cache controller in the CMC 210 performs level-two cache memory functions. The cache memory 208 is preferably implemented with SRAM technology. Alternatively, other processor-PCI bridges can be used, such as the various chip sets from Intel and other manufacturers.

The data buffers 212 and 213, which are preferably implemented with ASICs, are connected between the processor data bus PD and the memory data bus MD provided by the memory array 214. The data buffers 212 and 213 are also connected to the PCI address and data bus PCIAD through a connector 224, which is provided to be mateably received by the processor connector 114. The data buffers 212 and 213 are connected to various control signals from the CMC 210. Each data buffer receives half the data bits from the processor, memory and PCI data buses PD, MD, and PCIAD, respectively.

Clock distribution and generation circuitry 222 is located on the processor card P and is connected to the CMC 210. The clock distribution circuitry 222 provides a clock CLK to the processor bus 202. The processor connector 224 is connected to the CMC 210 and the clock distribution circuitry 222 to provide clocks to the computer system and to provide a PCI interface to allow the microprocessor 200 to access the PCI and EISA buses 98 and 99 and to allow PCI and EISA bus masters to access the main memory array 214. The PCI address and data are multiplexed on the bus PCIAD, with the address provided during the address phase and data provided during the data phase.

Figure 3:
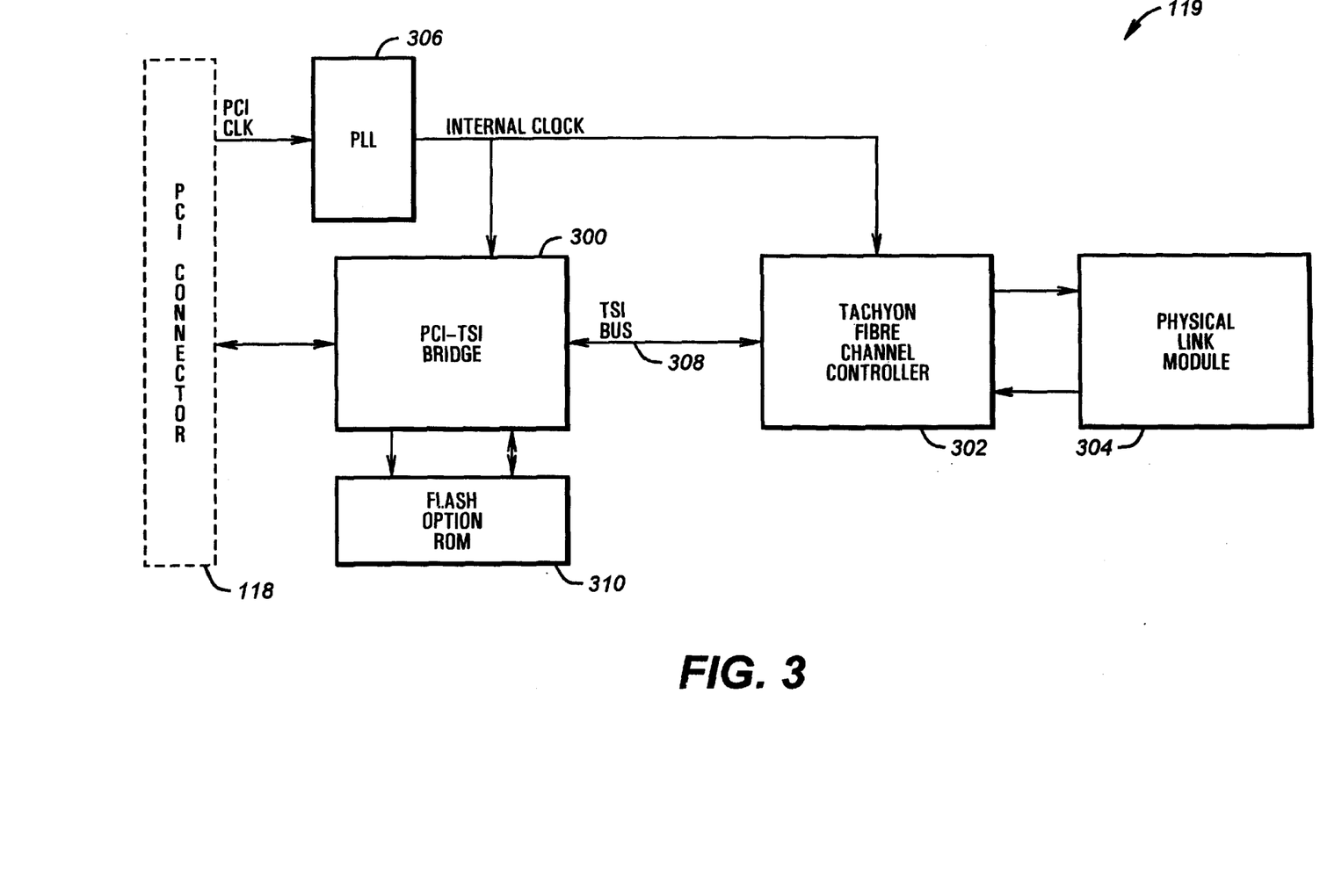
FIG. 3 is a block diagram of a Fibre Channel controller card incorporating the preferred embodiment of the present invention and which is connected to the system board of FIG. 1.

Referring to FIG. 3, a block diagram of the Fibre Channel controller card 119 is shown. The Fibre Channel controller card 119 includes a PCI-TSI (Tachyon System Interface) bridge 300, which is connected on one side to the PCI network connector 118. The PCI-TSI bridge 300 is also connected through a TSI bus 308 to a Tachyon Fibre Channel controller 302. The Fibre Channel controller 302 performs the necessary control functions for transferring data between the computer system and a network communications channel (not shown) according to the Fibre Channel Physical and Signalling Interface Specification, Revision 4.3 (June 1994). Connected to the Fibre Channel controller 302 is a physical link module 304 for connection to the Fibre Channel communications network, which can be formed of either fiber optics or copper wires. A clock generator 306 receives the PCI clock PCICLK and generates an internal clock to the PCI-TSI bridge 300 and the Fibre Channel controller 302. Optionally, a flash ROM 310 can be connected to the PCI-TSI bridge 300 for storing configuration information for the Fibre Channel controller card 119.

Figure 4:
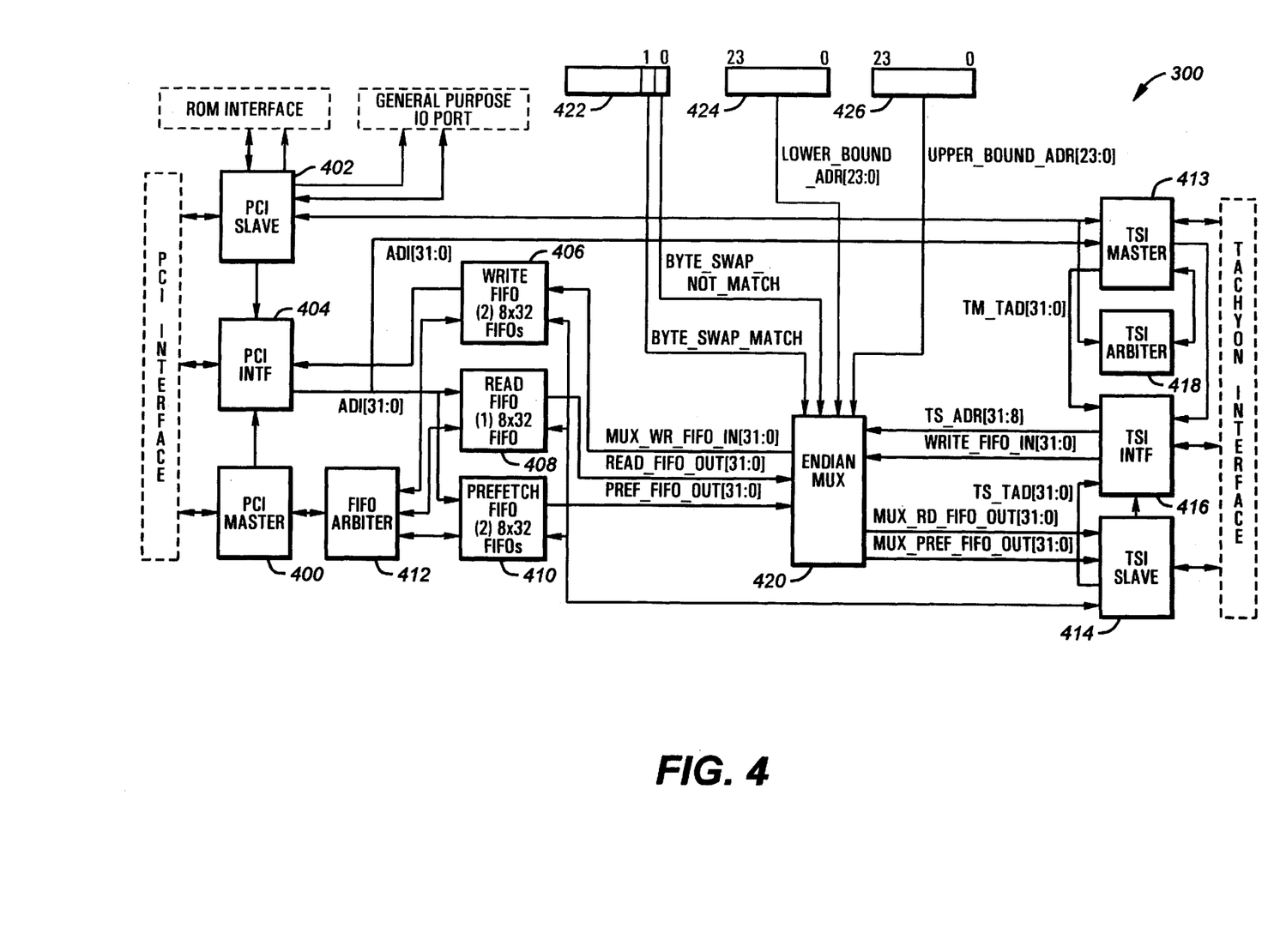
FIG. 4 is a block diagram of a bridge chip in the Fibre Channel controller card of FIG. 3.

Referring to FIG. 4, a block diagram of the PCI-TSI bridge 300 is shown. On the PCI side of the PCI-TSI bridge 300, a PCI master 400 and a PCI slave 402 are included to perform the necessary master and slave functions on the PCI bus 98. PCI address, data and parity information are routed between a PCI interface block 404 and the PCI bus 98. The PCI-TSI bridge 300 also includes write FIFOs 406, a read FIFO 408 and prefetch read FIFOs 410. In the preferred embodiment, two write FIFOs 406 are included, with each write FIFO organized as 32 bits wide and 8 entries deep. The write FIFOs 406 are used to store write data from the Fibre Channel controller 302 destined to computer system memory. By using the write FIFOs 406, a burst data transfer rate of 106 Mbytes per second can be achieved in the preferred embodiment on writes to the PCI bus 98.

Only one read FIFO 408 is used, and it is organized as 32 bits wide and 8 entries deep. The bridge 300 also includes two prefetch read FIFOs 410, with each prefetch read FIFO also organized as 32 bits wide and 8 entries deep. The read FIFO 408 and prefetch read FIFOs 410 receive data signals ADI<31:0> from the PCI interface block 404. During read cycles from the PCI bus 98, the Fibre Channel controller 302 can prefetch data from system memory. By using the prefetch read FIFOs 410, a burst data transfer rate of 88 Mbytes per second can be achieved in the preferred embodiment on reads from the PCI bus 98. The read FIFO 408 is used for non-prefetch reads by the Fibre Channel controller 302.

A FIFO arbiter 412 determines which of the write FIFOs 406 or read FIFOs 408 or 410 have priority for the PCI master 400. If a TSI-to-PCI cycle is pending in the write FIFOs 406 and the Fibre Channel controller 302 concurrently requests a read cycle on the PCI bus 98, the FIFO arbiter 412 arbitrates between the concurrent write and read requests. In the preferred embodiment, the write FIFOs 406 are always given the highest priority by the FIFO arbiter 412.

On the TSI side of the PCI-TSI bridge 300, a TSI master 413 and a TSI slave 414 are included to perform the master and slave functions on the TSI bus 308. The TSI master 413 receives the PCI data signals ADI<31:0> from the PCI interface block 404. The TSI master 413 provides data bits TM_TAD<31:0> to a TSI interface block 416, which routes address, data and parity information to and from the TSI bus 308. The TSI interface block 416 also receives data bits TS_TAD<31:0> from the TSI slave 414.

In the preferred embodiment, the Fibre Channel controller 302 transfers data according to the big-endian format. Thus, if a write or read operation between the Fibre Channel controller 302 and the PCI bus 98 involves data, then a big-endian/little-endian data format conversion is performed. To that end, the PCI-TSI bridge 300 includes an endian-conversion block 420. The endian-conversion block 420 selectively performs big-endian/little-endian conversion when it detects that the read or write operation involves data and not instructions. It receives the data output of the read FIFO 408 on signals READ_FIFO_OUT<31:0> and the output of the prefetch read FIFOs 410 on data signals PREF_FIFO_OUT<31:0>. The endian-conversion block 420 receives write data signals from the TSI interface block 416 on signals WRITE_FIFO_IN<31:0>.

The write data driven by the endian-conversion block 420 are signals MUX_WR_FIFO_IN<31:0>, which are driven to the input of the write FIFOs 406. The signals MUX_WR_FIFO_IN<31:0> are the signals WRITE_FIFO_IN<31:0> after big-endian-to-little-endian conversion, if needed, is performed. The read and prefetch read data signals driven by the endian-conversion block 420 are signals MUX_RD_FIFO_OUT<31:0> and MUX_PREF_FIFO_OUT<31:0>, which are both driven to the TSI slave 414. The signals MUX_RD_FIFO_OUT<31:0> and MUX_PREF_FIFO_OUT<31:0> are the signals READ_FIFO_OUT<31:0> and PREF_FIFO_OUT<31:0>, respectively, after little-endian-to-big-endian conversion is performed, if needed. The TSI slave 414 routes the signals MUX_RD_FIFO_OUT<31:0> and PREF_FIFO_OUT<31:0> to the data signals TS_TAD<31:0>, which are in turn provided to the TSI interface block 416 and ultimately to the TSI bus 308.

In the preferred embodiment, instructions are stored in system memory in a first predefined range of memory addresses, and data are stored in a second predefined range of memory addresses outside the first range. The predefined ranges of addresses are defined by a register 424 specifying the upper 24 bits of a 32-bit lower bound address and a register 426 specifying the upper 24 bits of a 32-bit upper bound address. The first predefined range of addresses could be defined as those addresses between the lower and upper bound addresses, in which case the second predefined range of addresses would be outside the lower and upper bound addresses. Alternatively, the second range of addresses could be defined between the lower and upper bound addresses and the first range could be defined outside the lower and upper bound addresses. The lower bound address is represented as signals {LOWER_BOUND_ADR<23:0>, 00000000} and the upper bound address is represented as signals {UPPER_BOUND_ADR<23:0>, 00000000}.

Bits 0 and 1 of a register 422 define whether the second address range is between the lower and upper bound addresses or outside the lower and upper bound addresses. Bit 0 of the register 422 represents a signal BYTE_SWAP_NOT_MATCH, and bit 1 represents a signal BYTE_SWAP_MATCH. If bit 0 of the register 422 is set high, then the second range of addresses for storing data in system memory is outside the bounds defined by the lower bound address and the upper bound address, i.e., addresses having values less than the signals {LOWER_BOUND_ADR<23:0>, 00000000} or addresses having values greater than the signals {UPPER_BOUND_ADR<23:0>, 00000000}. Thus, if the signal BYTE_SWAP_NOT_MATCH is asserted high and if a source or destination address specified in a read or write operation is outside the range defined by the lower and upper bound addresses, then the endian-conversion block 420 performs a big-endian/little-endian conversion of the transferred data, i.e., write data is transformed from big-endian to little-endian and read data is transformed from little-endian to big-endian. The destination or source address is represented by signals TS_ADR<31:8> provided by the TSI interface block 416.

If bit 1 of the register 422 is set high, then the second address range for storing data in system memory is within the range defined by the lower and upper bound addresses. Thus, if the signal BYTE_SWAP_MATCH is set high, then big-endian/little-endian conversion is performed if the source or destination address specified in a read or write operation has a value that is greater than or equal to the signals {LOWER_BOUND_ADR<23:0>, 00000000} and less than or equal to the signals {UPPER_BOUND_ADR<23:0>, 00000000}.

To provide for added flexibility, the registers 422, 424, and 426 are each addressable either through the PCI configuration space, PCI memory space, or PCI I/O space. This allows the values in the registers 422, 424 or 426 to be changed while the computer system is in operation, which allows the amount of memory allocated to storing data and instructions to be changed dynamically. Thus, based on the values stored in the registers 422, 424 and 426, the endian-conversion conversion block 420 selectively performs big-endian/little-endian conversion in read and write operations between the PCI bus 98 and the TSI bus 308.

Figure 5:
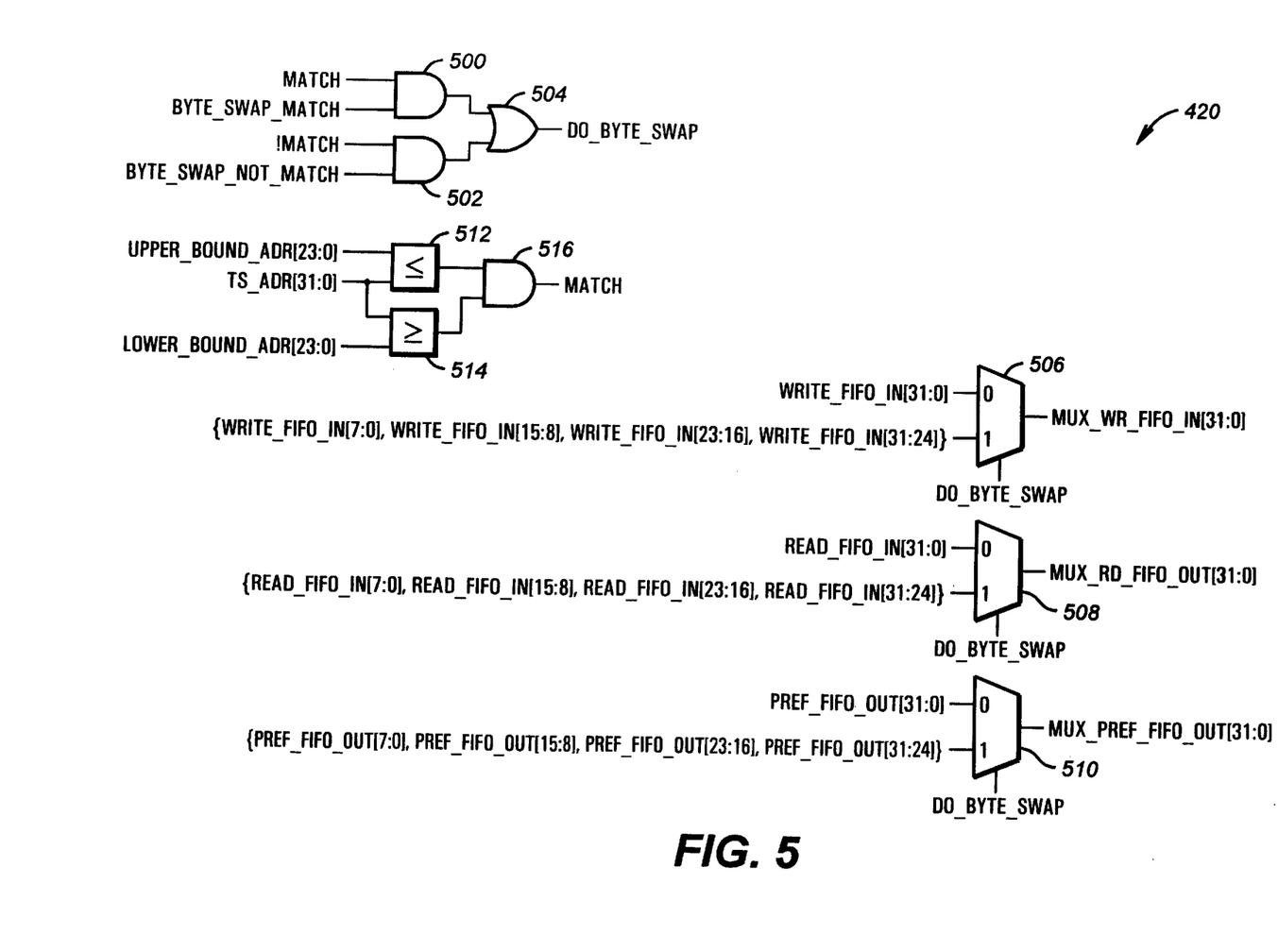
FIG. 5 is a schematic diagram of a circuit according to the present invention located in the Fibre Channel controller card of FIG. 3 which performs big-endian/little-endian data format conversion.

Referring to FIG. 5, a schematic diagram is shown of the logic in the endian-conversion block 420. A two-input AND gate 500 receives a signal MATCH and the signal BYTE_SWAP_MATCH from bit 1 of the register 422. The signal MATCH is driven by an AND gate 516 and is asserted if the value of the TSI address signals TS_ADR<31:0> is between the lower bound and upper bound addresses. The inputs of the AND gate 516 are connected to the outputs of a comparator 512 and a comparator 514. The comparator 512 determines if the address signals TS_ADR<31:8> have a value that is less than or equal to the signals UPPER_BOUND_ADR<23:0>, and the comparator 514 determines if the address signals TS_ADR<31:8> have a value that is greater than or equal to the signals LOWER_BOUND_ADR<23:0>.

As discussed above, the signal BYTE_SWAP_MATCH when asserted high indicates that the second address range is defined between the lower bound and upper bound addresses. The output of the AND gate 500 is connected to one input of a two-input OR gate 504, whose other input is connected to the output of a two-input AND gate 502. The AND gate 502 receives the inverted state of the signal MATCH and the signal BYTE_SWAP_NOT_MATCH provided by bit 0 of the register 422. As discussed above, the signal BYTE_SWAP_NOT_MATCH when asserted high indicates that the second address range is defined outside the lower bound and upper bound addresses. If the output of either the AND gate 500 or the AND gate 502 is asserted high, that indicates that the current write or read operation is directed to an address within the second predefined address range. The output of the OR gate 504 provides a signal DO_BYTE_SWAP, which when asserted high causes big-endian/little-endian data format conversion to occur.

The signal DO_BYTE_SWAP is provided to the select inputs of 64:32 multiplexors 506, 508 and 510. The 0 input of the multiplexor 506 receives write data signals WRITE_FIFO_IN<31:0> from the TSI interface block 416. The 1 input of the multiplexor 506 receives signals {WRITE_FIFO_IN<7:0>, WRITE_FIFO_IN<15:8>, WRITE_FIFO_IN<23:16>, WRITE_FIFO_IN<31:24>} or the big-endian-to-little-endian converted write data. The output of the multiplexor 506 drives the data signals MUX_WR_FIFO_IN<31:0> to the inputs of the write FIFOs 406.

The 0 input of the multiplexor 508 receives read data signals READ_FIFO_OUT<31:0> from the read FIFO 408. The 1 input of the multiplexor 508 receives read data signals {READ_FIFO_OUT<7:0>, READ_FIF_OUT<15:8>, READ_FIFO_OUT<23:16>, READ_FIFO_OUT<31:24>} or the little-endian-to-big-endian converted read data. The output of the multiplexor 508 drives the signals MUX_RD_FIFO_OUT<31:0> to the TSI slave 414.

The 0 input of the multiplexor 510 receives the prefetch read data signals PREF_FIFO_OUT<31:0> and its 1 input receives the signals {PREF_FIFO_OUT<7:0>, PREF_FIFO_OUT<15:8>, PREF_FIFO_OUT<23:16> PREF_FIFO_OUT<31:24>} or the little-endian-to-big-endian converted prefetch read data signals. The output of the multiplexor 510 drives the signals MUX_PREF_FIFO_OUT<31:0>.

Thus, a circuit has been disclosed for selectively performing big-endian/little-endian data format conversion based on whether instructions or data are being transferred. The data and instructions are allocated to different regions in memory so that the big-endian/little-endian conversion is based on the source or destination address of the requested operation. Registers are provided to define a lower bound address and an upper bound address. In addition, a separate register is provided which indicates whether the data is stored between the lower bound and upper bound addresses or outside the lower bound and upper bound addresses. The registers are write addressable through the PCI configuration space, the memory space, and the I/O space, which allows the values in the registers to be changed dynamically during computer system operation.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

In the claims:

1. A circuit in a computer system having a first device and a second device for selectively converting the format of information specified in a transfer operation between the first device and the second device, the circuit comprising:

means for determining if the transfer operation specifies an address that is in a first predefined range of data addresses or a second, different predefined range of instruction addresses; and means coupled to said determining means for switching the information format between a first format and a second format if said address is within said second predefined range and maintaining the information format unchanged if said address is within said first predefined range.

2. The circuit of claim 1, wherein the first format is the little-endian format and the second format is the big-endian format.

3. The circuit of claim 2, wherein the first device is a memory device and the second device is a peripheral device, and wherein said first predefined range and second predefined range of addresses are part of the memory space of the computer system.

4. The circuit of claim 3, wherein information is stored in said first format in said memory device.

5. The circuit of claim 3, wherein information is stored in said second format in said peripheral device.

6. The circuit of claim 1, further comprising:
a first register for specifying a lower bound address; and
a second register for specifying an upper bound address, wherein said first predefined range and said second predefined range of addresses are defined by said lower bound address and upper bound address.

7. The circuit of claim 6, wherein said first predefined range is defined between said lower bound address and said upper bound address and said second predefined range is defined outside said lower bound address and said upper bound address.

8. The circuit of claim 6, wherein said second predefined range is defined between said lower bound address and said upper bound address and said first predefined range is defined outside said lower bound address and said upper bound address.

9. The circuit of claim 6, further comprising:
a third register containing a control value for indicating how said first predefined range and second predefined range of addresses are defined by said lower bound address and said upper bound address.

10. The circuit of claim 9, wherein if said third register contains a first control value, said first predefined range is defined between said lower bound address and said upper bound address and said second predefined range is defined outside said lower bound address and said upper bound address, and wherein if said third register contains a second control value, said second predefined range is defined between said lower bound address and upper bound address and said first predefined range is outside said lower bound address and said upper bound address.

11. A method for selectively converting the format of information specified in a transfer operation between a first device and a second device in a computer system, the method comprising the steps of:
determining if the transfer operation specifies an address that is in a first predefined range of data addresses or a second, different predefined range of instruction addresses; and
switching the information format between a first format and a second format if said address is within said second predefined range and maintaining the information format unchanged if said address is within said first predefined range.

12. The method of claim 11, wherein said first format is the little-endian format and said second format is the big-endian format.

13. The method of claim 11, further comprising the steps of:
defining said first predefined range between a lower bound address and an upper bound address; and
defining said second predefined range outside said lower bound address and said upper bound address.

14. The method of claim 11, further comprising the steps of:
defining said second predefined range between a lower bound address and an upper bound address; and
defining said first predefined range outside said lower bound address and said upper bound address.

15. A computer system, comprising:
a first device;
a second device; and
a circuit coupled between said first and second devices for selectively converting the format of information specified in a transfer operation between said first device and said second device, said conversion circuit including:
means for determining if said transfer operation specifies an address that is in a first predefined range of addresses or a second, different predefined range of addresses; and
means coupled to said determining means for switching the information format between a first format and a second format if said address is within said second predefined range and maintaining the information format unchanged if said address is within said first predefined range.

16. The computer system of claim 15, wherein said first format is the little-endian format and said second format is the big-endian format.

17. The computer system of claim 16, wherein said first device is a memory device and said second device is a peripheral device, and wherein said first predefined range and second predefined range of addresses are part of the memory space of the computer system.

18. The computer system of claim 17, wherein information is stored in said memory device in said first format.

19. The computer system of claim 17, wherein information is stored in said peripheral device in said second format.

20. The computer system of claim 15, wherein said conversation circuit further includes:
a first register for specifying a lower bound address; and
a second register for specifying an upper bound address, wherein said first predefined range and second predefined range of addresses are defined by said lower bound address and said upper bound address.

21. The computer system of claim 20, wherein said first predefined range is defined between said lower bound address and said upper bound address and said second predefined range is defined outside said lower bound address and said upper bound address.

22. The computer system of claim 20, wherein said second predefined range is defined between said lower bound address and said upper bound address and said first predefined range is defined outside said lower bound address and said upper bound address.

23. The computer system of claim 20, further comprising:
a third register containing a control value for indicating how said first predefined range and second predefined range of addresses are defined by said lower bound address and said upper bound address.

24. The computer system of claim 23, wherein if said third register contains a first control value, said first predefined range is defined between said lower bound address and said upper bound address and said second predefined range is defined outside said lower bound address and said upper bound address, and wherein if said third register contains a second control value, said second predefined range is defined between said lower bound address and said upper bound address and said first predefined range is defined outside said lower bound address and said upper bound address.

25. A circuit in a computer system having a first device and a second device for selectively converting the format of information specified in a transfer operation between the first device and the second device, the circuit comprising:

address detection logic for determining if the transfer operation specifies an address that is in a first predefined range of data addresses or a second, different predefined range of instruction addresses; and selective conversion logic coupled to said determining address detection logic for switching the information format between a first format and a second format if said address is within said second predefined range and further maintaining the information format unchanged if said address is within said first predefined range.

26. The circuit of claim 25, wherein the first format is the little-endian format and the second format is the big-endian format.

27. The circuit of claim 26, wherein the first device is a memory device and the second device is a peripheral device, and wherein said first predefined range and second predefined range of addresses are part of the memory space of the computer system.

28. The circuit of claim 27, wherein information is stored in said first format in said memory device.

29. The circuit of claim 27, wherein information is stored in said second format in said peripheral device.

30. The circuit of claim 25, further comprising:

a first register for specifying a lower bound address; and a second register for specifying an upper bound address, wherein said first predefined range and said second predefined range of addresses are defined by said lower bound address and upper bound address.

31. The circuit of claim 30, wherein said first predefined range is defined between said lower bound address and said upper bound address and said second predefined range is defined outside said lower bound address and said upper bound address.

32. The circuit of claim 30, wherein said second predefined range is defined between said lower bound address and said upper bound address and said first predefined range is defined outside said lower bound address and said upper bound address.

33. The circuit of claim 30, further comprising:

a third register containing a control value for indicating how said first predefined range and second predefined range of addresses are defined by said lower bound address and said upper bound address.

34. The circuit of claim 33, wherein if said third register contains a first control value, said first predefined range is defined between said lower bound address and said upper bound address and said second predefined range is defined outside said lower bound address and said upper bound address, and wherein if said third register contains a second control value, said second predefined range is defined between said lower bound address and upper bound address and said first predefined range is outside said lower bound address and said upper bound address.

35. A computer system, comprising:

a first device;

a second device; and a circuit coupled between said first and second devices for selectively converting he format of information specified in a transfer operation between said first device and said second device, said conversion circuit including:

address detection logic for determining if said transfer operation specifies an address that is in a first predefined range of data addresses or a second, different predefined range of instruction addresses; and selective conversion logic coupled to said determining address detection logic for switching the information format between a first format and a second format if said address is within said second predefined range and maintaining the information format unchanged if said address is within said first predefined range; wherein the information stored in said second predefined range is data, and the information stored in said first predefined range are instructions.

36. The computer system of claim 35, wherein said first format is the little-endian format and said second format is the big-endian form.

37. The computer system of claim 36, wherein said first device is a memory device and said second device is a peripheral device, and wherein said first predefined range and second predefined range of addresses are part of the memory space of the computer system.

38. The computer system of claim 37, wherein information is stored in said memory device in said first format.

39. The computer system of claim 37, wherein information is stored in said peripheral device in said second format.

40. The computer system of claim 35, wherein said conversion circuit further includes:

a first register for specifying a lower bound address; and a second register for specifying an upper bound address, wherein said first predefined range and second predefined range of addresses are defined by said lower bound address and said upper bound address.

41. The computer system of claim 40, wherein said first predefined range is defined between said lower bound address and said upper bound address and said second predefined range is defined outside said lower bound address and said upper bound address.

42. The computer system of claim 40, wherein said second predefined range is defined between said lower bound address and said upper bound address and said first predefined range is defined outside said lower bound address and said upper bound address.

43. A circuit in a computer system having a first device and a second device for selectively converting the format of information specified in a transfer operation between the first device and the second device, wherein:

the first device stores the information in either the first address range or the second address range;

the first address range is a non-conversion address range;

the second address range is a conversion address range; and the circuit performs the following steps:

determining whether the transfer operation specifies an address in the conversion address range or the non-conversion range;

converting the information format between a first format and a second format if the address is in the conversion address range;

not converting the information format if the information is in the non-conversion address range; and storing the information such that it may be retrieved by the second device.

* * * * *

UNITED STATES PATENT AND TRADEMARK OFFICE
CERTIFICATE OF CORRECTION

PATENT NO.   : 5,970,236
DATED        : October 19, 1999
INVENTOR(S)  : Galloway et al.

It is certified that error appears in the above-identified patent and that said Letters Patent is hereby corrected as shown below:

Column 11,
Line 62, delete "he" and insert therefor -- the --

Signed and Sealed this

Twenty-sixth Day of July, 2005

JON W. DUDAS
*Director of the United States Patent and Trademark Office*